June 7, 1927.
O. STOFFEL
PACKING RING
Filed Feb. 3, 1922
1,631,654
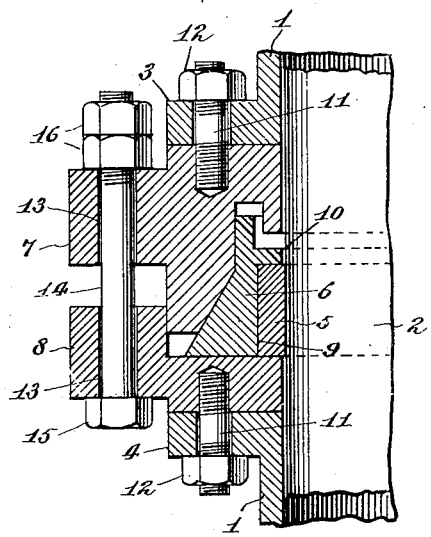
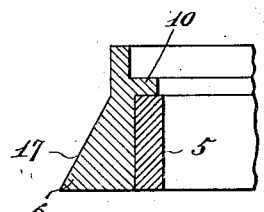
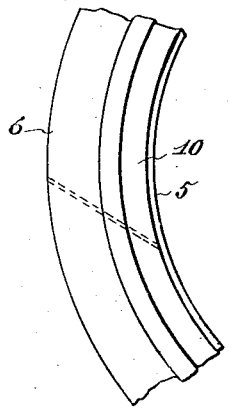
WITNESSES
INVENTOR
Oskar Stoffel
BY
ATTORNEYS Patented June 7, 1927.

1,631,654

UNITED STATES PATENT OFFICE.

OSKAR STOFFEL, OF BADEN, GERMANY.

PACKING RING.

Application filed February 3, 1922, Serial No. 533,837, and in Germany July 30, 1921.

This invention relates to packing rings, an object of the invention being to provide a packing ring which is capable of contractile adjustment so that the piston ring works constantly on any or all points of the periphery of a rod or piston or similar device through which it contacts.

With this and other objects in view, the invention consists in certain novel features of construction and combinations and arrangements of parts, which will be more fully hereinafter described and pointed out in the claim.

In the accompanying drawing—

Figure 1 is a fragmentary view in longitudinal section, illustrating my improved packing ring;

Figure 2 is a fragmentary view in section of the packing ring per se and the contractile ring back of the same;

Figure 3 is a fragmentary plan view of Figure 2.

1, 1 represent alined sections of a tubular member which are spaced apart the desired distance and which enclose a rod, piston or other cylindrical member 2 to be packed.

The members 1, 1 have radially projecting perforated lugs 3 and 4 thereon, respectively, for a purpose which will hereinafter appear.

My improved packing ring comprises four separate and distinct members, namely, a non-metallic packing ring per se 5, a contractile metal ring 6, and two outer rings 7 and 8.

The contractile ring 6 at its inner portion is recessed, as shown at 9, to receive the ring 5, and an annular inwardly projecting flange 10 is formed on the contractile ring 6, and the ring 5 is held between this flange 10 and the outer ring 8 so as to hold the same against longitudinal expansion.

Studs 11 are secured in the outer rings 7 and 8 and project through the perforated lugs 3, 4, and have nuts 12 on their outer ends. The outer rings 7 and 8 are provided with alined openings 13 receiving a bolt 14, the latter having a head 15 at one end and nuts 16 at its other end.

The outer face of the contractile ring 6 and the inner face of outer ring 7 have correspondingly tapered contacting walls or faces 17, so that when the outer rings are moved toward each other the ring 6 will be contracted to contract the ring 5 to suit conditions.

When it is desired to adjust these parts at least one of the nuts 12 must be loosened and the nuts 16 tightened on the bolt 14, as will be clearly understood.

Various slight changes and alterations might be made in the general form of the parts described without departing from my invention and hence I do not limit myself to the precise details set forth but consider myself at liberty to make such slight changes and alterations as fairly fall within the spirit and scope of the appended claim.

I claim:

The combination with a tubular member and perforated lugs projecting therefrom, of a packing including a packing ring, a contractile metal ring receiving the packing ring and holding the same against longitudinal expansion, a longitudinally movable outer ring, a second outer ring with which the first outer ring and said contractile ring telescopes, said last-mentioned ring beng secured respectively to said lugs, means guiding the first outer ring and holding the same against possibility of radial expansion, said first outer ring and sad contractile ring having longitudinally beveled or tapering engaging faces, and means for moving the outer ring longitudinally.

OSKAR STOFFEL, Ing.